(12) United States Patent
Reedijk et al.

(10) Patent No.: US 8,241,601 B2
(45) Date of Patent: Aug. 14, 2012

(54) PROCESS FOR PREPARING LAYERED DOUBLE HYDROXIDE COMPRISING CARBONATE

(75) Inventors: Marianne Frederika Reedijk, Ochten (NL); Auke Gerardus Talma, Bathmen (NL); Aaldert Johannes De Jong, Voorthuizen (NL)

(73) Assignee: Akzo Nobel N.V., Arnhem (NL)

( * ) Notice: Subject to any disclaimer, the term of this patent is extended or adjusted under 35 U.S.C. 154(b) by 615 days.

(21) Appl. No.: 12/442,451

(22) PCT Filed: Sep. 19, 2007

(86) PCT No.: PCT/EP2007/059869
§ 371 (c)(1),
(2), (4) Date: Mar. 27, 2009

(87) PCT Pub. No.: WO2008/034835
PCT Pub. Date: Mar. 27, 2008

(65) Prior Publication Data
US 2010/0029822 A1     Feb. 4, 2010

Related U.S. Application Data

(60) Provisional application No. 60/849,217, filed on Oct. 3, 2006.

(30) Foreign Application Priority Data

Sep. 21, 2006  (EP) .................................. 06121063

(51) Int. Cl.
*C01C 1/26* (2006.01)
*C08L 61/04* (2006.01)
(52) U.S. Cl. ........................................ 423/420; 524/424
(58) Field of Classification Search .................. 423/420; 524/424
See application file for complete search history.

(56) References Cited

U.S. PATENT DOCUMENTS

| 4,539,195 A | 9/1985 | Schanz et al. |
| 5,728,366 A | 3/1998 | Martin et al. |
| 2005/0020749 A1 | 1/2005 | Fujii et al. |

FOREIGN PATENT DOCUMENTS

| DE | 102 17 364 | 10/2003 |
| WO | 96/01540 | 1/1996 |
| WO | WO 96/05140 A1 * | 2/1996 |

OTHER PUBLICATIONS

Cavani et al., "Hydrotalcite-Type Anionic Clays: Preparation, Properties and Applications", *Catalysis Today*, vol. 11, p. 173-301, (1991).
Bookin et al., "Polytype Diversity of the Hydrotalcite-Like Minerals II. Determination of the Polytypes of Experimentally Studied Varieties", *Clays and Clay Minerals*, vol. 44, No. 5, p. 558-564, (1993).
B. Elvers et al., *Ullmann's Encyclopedia of Industrial Chemistry*, vol. A20, p. 497, (1992).
International Search Report and Written Opinion, International Application No. PCT/EP2007/059869, mailed Dec. 17, 2007.
International Preliminary Report on Patentability, International Application No. PCT/EP2007/059869, mailed Nov. 28, 2008.
English language machine translation of DE10217364 (published Oct. 30, 2003).

* cited by examiner

*Primary Examiner* — Porfirio Nazario Gonzalez
(74) *Attorney, Agent, or Firm* — Robert C. Morriss; Kevin T. Godlewski

(57) ABSTRACT

The invention relates to a process for the production of a layered double hydroxide comprising carbonate by preparing a divalent and trivalent metal ion source-containing slurry, which is subsequently treated solvothermally. If the slurry does not contain a divalent metal ion source containing carbonate, a carbonate source is added during or after the solvothermal treatment.

11 Claims, No Drawings

PROCESS FOR PREPARING LAYERED DOUBLE HYDROXIDE COMPRISING CARBONATE

REFERENCE TO RELATED APPLICATION(S)

This application is the U.S. National Phase of PCT/EP2007/059869 filed on Sep. 19, 2007 and claims the benefit of U.S. Provisional Application No. 60/849,217 filed on Oct. 3, 2006.

The invention relates to a process for preparing layered double hydroxides comprising carbonates as charge-balancing anions.

DE 102 17 364 describes the production of hydrotalcite by intensive milling at atmospheric pressure and below 100° C. of a slurry comprising oxides, hydroxides or carbonates of divalent and trivalent metals, wherein the carbonate can be a $MgCO_3$ or $Mg(HCO_3)_2$.

U.S. Pat. No. 4,539,195 discloses a process for producing a basic magnesium aluminium hydroxycarbonate of the formula $Al_2Mg_6(OH)_{12}(CO_3)_3.xH_2O$ by conversion of aluminium hydroxide with basic magnesium carbonate and at least one compound selected from magnesium hydroxide and magnesium oxide. The conversion takes place at temperatures from 50 to 100° C.

WO 96/05140 describes a process for making synthetic hydrotalcite wherein hydromagnesite ($Mg_5(CO_3)_4(OH)_2.4H_2O$) and an alumina source (rehydratable alumina or pseudoboehmite) are converted into hydrotalcite at various temperatures ranging from 50 to 90° C.

It is an object of the present invention to provide an improved process for preparing a layered double hydroxide comprising carbonate as charge-balancing anion.

This objective is achieved with a process for preparing a layered double hydroxide comprising carbonate as charge-balancing anion comprising the steps of:
a) preparing a slurry or solution comprising a trivalent metal ion source, a divalent metal ion source, and a suspending medium, the divalent metal ion source being a source free of carbonate and/or a source containing carbonate;
b) solvothermally treating the slurry or solution, and optionally adding a carbonate source to the slurry during or after the solvothermal treatment, to form the layered double hydroxide comprising carbonate; and
if the slurry or solution does not contain a divalent metal ion source containing carbonate, a carbonate source is added to the slurry or solution during or after the solvothermal treatment.

The process of the invention has the advantage that it can be performed within a shorter period of time than conventional processes conducted at atmospheric pressure, which renders this process more attractive economically. Moreover, a hydrothermal after-treatment is not necessary at all or the time needed for the after-treatment can be considerably reduced, thus shortening the production process even more.

The process of the invention can be conducted by preparing a slurry or solution comprising a trivalent metal ion source, a carbonate-containing divalent metal ion source, and a carbonate-free divalent metal ion source. If in such case the amount of carbonate in the slurry or solution is sufficient to form an LDH with the desired amount of carbonate in the interlayer, the addition of a carbonate source is not necessary. However, if the amount of carbonate is not sufficient, a carbonate source is generally added before, during or after step b) of the process. Preferably, the carbonate source is added during or after step b). Alternatively, if a carbonate-containing divalent metal ion source is absent in the slurry or solution of step a), the addition of the carbonate source before, during or after step b) is necessary in order to obtain an LDH comprising carbonate as charge-balancing anion. In a preferred embodiment, the carbonate source is added during or after step b).

The carbonate source can be any suitable carbonate source known in the art. Examples of such a carbonate source are carbon dioxide ($CO_2$), an alkali metal carbonate such as sodium or potassium carbonate, and an alkali metal bicarbonate such as sodium or potassium bicarbonate. It is also contemplated to use one or more carbonate sources. These sources may be added simultaneously or at different stages in the process. Of these carbonate sources carbon dioxide is preferred, as no salt which will end up in the waste stream and which needs to be removed is added to the slurry or solution.

The invention further pertains to a layered double hydroxide comprising carbonate as charge-balancing anion having an average L/D value above 100. Such LDHs can be prepared with the process of the invention as described above. The layered double hydroxides of the invention differ from the LDHs comprising carbonate known in the art in that the average L/D of the LDH of the invention is considerably higher than the values observed for the known LDHs—the latter being well below 100.

As indicated, the LDHs of the invention have a morphology different from that of conventional LDHs. The average length over diameter ratio (L/D ratio) of the individual platelets in the LDH exceeds 100, preferably the L/D ratio is at least 150, more preferably the L/D ratio is at least 200, and even more preferably the L/D ratio is at least 250. The L/D ratio can be determined using electron microscopy such as scanning electron microscopy (SEM) and/or TEM. The length is the largest size of the platelets in the direction perpendicular to the stacking direction, and the diameter refers to the thickness of the clay particles in the stacking direction. It is noted that the average length and the average diameter can be determined by taking the average length and diameter of 20 clay particles, for example. The number of clay particles may also be larger or smaller, as long as the average values are statistically justifiable.

Alternatively or additionally, the LDHs of the invention generally have an average length of the individual platelets of at least 400 nm; preferably the average length is at least 500 nm, and most preferably the average length is at least 600 nm. The average length is defined and determined using the methods described for the L/D value above.

In the context of the present application the term "charge-balancing anion" refers to anions that compensate for the electrostatic charge deficiencies of the crystalline clay sheets of the LDH. As the clay typically has a layered structure, the charge-balancing anions may be situated in the interlayer, on the edge or on the outer surface of the stacked clay layers. Such anions situated in the interlayer of stacked clay layers are referred to as intercalating ions.

The LDHs comprising charge-balancing organic anions have a layered structure corresponding to the general formula:

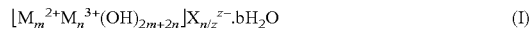
$$[M_m^{2+}M_n^{3+}(OH)_{2m+2n}]X_{n/z}^{z-}.bH_2O \qquad (I)$$

wherein $M^{2+}$ is a divalent metal ion such as $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, and $Mg^{2+}$, $M^{3+}$ is a trivalent metal ion such as $Al^{3+}$, $Cr^{3+}$, $Fe^{3+}$, $Co^{3+}$, $Mn^{3+}$, $Ni^{3+}$, $Ce^{3+}$, and $Ga^{3+}$, m and n have a value such that m/n=1 to 10, and b has a value in the range of from 0 to 10. It is also contemplated to use three or more different metal ions in the layered double hydroxide prepared with the process of the invention. Of the above metal ions the combination of $Mg^{2+}$ and/or $Zn^{2+}$ as divalent metal ions and $Al^{3+}$ as trivalent metal ion is preferred. X is carbonate ($CO_3^{2-}$) or a mixture of carbonate and one or more inorganic or organic anions known in the art. Examples of suitable inorganic anions other than carbonate include hydroxide, bicarbonate, nitrate, chloride, bromide, sulfonate, sulfate, bisulfate, vanadates, tungstates, borates, and phosphates. For the purpose of this specification, carbonate and bicarbonate anions are defined as being of inorganic nature. Examples of suitable organic anions can be found in U.S. Pat. No. 5,728,366 and US 2005/020749.

The LDH of the invention includes hydrotalcite and hydrotalcite-like anionic LDHs. Examples of such LDHs are meixnerite, manasseite, pyroaurite, sjögrenite, stichtite, barberonite, takovite, reevesite, and desautelsite.

In one embodiment of the invention, the layered double hydroxide has a layered structure corresponding to the general formula.

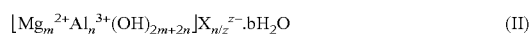
$$[Mg_m^{2+}Al_n^{3+}(OH)_{2m+2n}]X_{n/z}^{z-}.bH_2O \qquad (II)$$

wherein m and n have a value such that m/n=1 to 10, preferably 1 to 6, more preferably 2 to 4, and most preferably a value close to 3; b has a value in the range of from 0 to 10, generally a value of 2 to 6, and often a value of about 4. X is a charge-balancing ion as defined above. It is preferred that m/n should have a value of 2 to 4, more particularly a value close to 3.

In another embodiment of the invention, the layered double hydroxide has a layered structure corresponding to the general formula:

$$[Mg_m^{2+}Zn_n^{2+}Al_p^{3+}(OH)_{2m+2n+2p}]X_{n/z}^{z-}.bH_2O \qquad (III)$$

wherein m and n have a value such that (m+n)/p=1 to 10, preferably 1 to 6, more preferably 2 to 4, and most preferably a value close to 3; b has a value in the range of from 0 to 10, generally a value of 2 to 6, and often a value of about 4. X is a charge-balancing ion as defined above. It is preferred that (m+n)/p should have a value of 2 to 4, more particularly a value close to 3.

The LDH may have any crystal form known in the art, such as described by Cavani et al. (*Catalysis Today*, 11 (1991), pp. 173-301) or by Bookin et al. (*Clays and Clay Minerals*, (1993), Vol. 41(5), pp. 558-564), such as $3H_1$, $3H_2$, $3R_1$, or $3R_2$ stacking. In one embodiment, the LDH has $3R_1$ stacking.

In the context of this application the terms "solvothermal treatment" and "solvothermally" refer to the treatment of the precursor suspension/slurry or solution at a pressure above atmospheric pressure and a temperature which generally is above the boiling point of the precursor suspension or solution at atmospheric pressure. The pressure generally is from 1 bar to 200 bar, preferably from 2 bar to 100 bar, and most preferably from 3 bar to 10 bar. Generally, the temperature is 100° C. or higher, preferably from 100° C. to 300° C., more preferably from 110° C. to 250° C., and most preferably from 120° C. to 200° C. The suspending medium used in the process of the invention can be any suitable suspending medium known in the art. The suspending media include water, an organic solvent or mixtures thereof. Suitable examples of organic solvents include alcohols such as methanol, ethanol, 1-propanol, and isopropanol; and alkoxylated alcohols such as propylene glycol monomethyl ether and propylene glycol monoethyl ether; and alkanes such as pentane, hexane, and heptane; and aromatic hydrocarbons such as benzene, toluene, and xylene. Preferably, the suspending medium comprises water, an alcohol and/or an alkoxylated alcohol. A solvothermal treatment in a suspending medium comprising water and an organic solvent or containing only water is also referred to as a "hydrothermal treatment".

The divalent metal ion source containing carbonate, the trivalent metal ion source, and the divalent metal ion source free of carbonate used in the processes of the present invention can be any source known to the man skilled in the art. These sources include soluble salts of the divalent and/or trivalent metal ions as well as insoluble or partially insoluble divalent and trivalent metal ion sources, or mixtures thereof.

Soluble salts of metal ion sources include nitrates, chlorides, perchlorates, and also aluminates. The insoluble or partially insoluble divalent and trivalent metal ion sources generally include oxides or hydroxides, carbonates of the divalent or trivalent metal ions. Preferably, the sources are insoluble or partially soluble. Most preferably, the further divalent and trivalent metal ion sources are oxides and/or hydroxides.

In the context of the present application "soluble salts" refers to divalent and trivalent metal ion sources that dissolve completely and form a clear solution at room temperature. In the context of the present application the wording "insoluble or partially insoluble" refers to sources that do not dissolve completely and form a suspension at room temperature.

Examples of divalent metal ions are $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, and $Mg^{2+}$. Examples of trivalent metal ions are $Al^{3+}$, $Cr^{3+}$, $Fe^{3+}$, $Co^{3+}$, $Mn^{3+}$, $Ni^{3+}$, $Ce^{3+}$, and $Ga^{3+}$. It is also contemplated to use three or more different metal ions in the layered double hydroxide prepared with the process of the invention. Of the above metal ions the combination of $Mg^{2+}$ and/or $Zn^{2+}$, and $Al^{3+}$ is preferred.

The magnesium source containing carbonate is generally selected from the group consisting of magnesium hydroxycarbonate, hydromagnesite ($Mg_5(CO_3)_4(OH)_2$), magnesium carbonate, magnesium bicarbonate, and dolomite. A combination of two or more carbonate-containing magnesium sources is also contemplated.

Examples of suitable magnesium sources which are insoluble or partially insoluble include magnesium oxide, magnesium hydroxide, magnesium hydroxycarbonate, hydromagnesite ($Mg_5(CO_3)_4(OH)_2$), magnesium carbonate, magnesium bicarbonate, dolomite, and sepiolite. The magnesium source free of carbonate may be magnesium oxide or magnesium hydroxide. A combination of two or more magnesium sources is also contemplated.

The zinc source containing carbonate is generally selected from the group consisting of zinc hydroxycarbonate, zinc carbonate, and zinc bicarbonate. A combination of two or more carbonate-containing zinc sources is also contemplated.

Examples of suitable zinc sources which are insoluble or partially insoluble include zinc oxide, zinc hydroxide, zinc hydroxycarbonate, zinc carbonate, and zinc bicarbonate. The zinc source free of carbonate may be zinc oxide or zinc hydroxide. A combination of two or more zinc sources is also contemplated. It is also contemplated to use a combination of at least one magnesium source and at least one zinc source.

The aluminium source which is insoluble or partially insoluble typically is a hydroxide or an oxide of aluminium. Examples of such an aluminium source are aluminium trihydroxides such as gibbsite and bayerite, aluminium oxohydroxides such as boehmite, diaspore or goethite, and transition aluminas, which are known to the man skilled in the art.

The use of the above insoluble or partially soluble divalent metal ion and trivalent metal ion sources in the process of the invention provides a process that is more environment-friendly, as considerably less salt—if any—remains in the waste stream resulting from the process. Moreover, the divalent and trivalent metal ion sources, and in particular the magnesium, zinc, and aluminium sources, generally are less expensive than the corresponding salts commonly used in the production of layered double hydroxides. In addition, the process of the invention generally is simpler, as it requires fewer steps and/or does not require an after-treatment of the waste stream. Furthermore, these processes may be performed in a much shorter time, which in turn may lead to a higher production rate of the layered double hydroxide compared to conventional processes.

In a preferred embodiment of the present invention, the insoluble or partially soluble divalent and/or trivalent metal ion sources, and in particular the magnesium, zinc and/or aluminium sources, are milled prior to step (b). These metal ion sources may be milled in the presence of the suspending medium or without the suspending medium. In the processes of the invention the divalent and/or trivalent metal ion sources generally have a d50 value of less than 20 µm and a d90 value of less than 50 µm. Preferably, the d50 value is less than 15 µm and the d90 value is less than 40 µm, more preferably the d50 value is less than 10 µm and the d90 value is less than 30 µm, even more preferably the d50 value is less than 8 µm and the d90 value is less than 20 µm, and most preferably the d50 value is less than 6 µm and the d90 value is less than 10 µm. The particle size distribution can be determined using methods known to the man skilled in the art, e.g. laser diffraction in accordance with DIN 13320. This milling step allows the formation of the layered double hydroxide to proceed faster. It further may reduce the amount of impurities such as gibbsite or brucite if the divalent and trivalent metal ion sources are magnesium and aluminium sources.

Generally, at least 10% of the total amount of charge-balancing anions is carbonate, preferably at least 30%, more preferably at least 60%, and most preferably at least 90% of the total amount of charge-balancing anions is carbonate. It is also envisaged that 100% of the total amount of charge-balancing anions is carbonate.

In one embodiment of the invention, a mixture of the divalent metal ion source containing carbonate and the further divalent metal ion source free of carbonate is used. The weight ratio of the carbonate-containing and carbonate-free divalent metal ion sources is generally from 100:1 to 1:100, preferably from 50:1 to 1:50, and most preferably from 10:1 to 1:10.

In one embodiment of the invention, the LDH is treated with a coating agent in order to render the LDH more hydrophobic. Such a coating agent can be any coating agent known in the art. Examples of such coating agents include mono-, di- or polycarboxylic acids, sulfonic acids, phosphonic acids, and sulfate acids, thiols, benzothiols, phenols, and salts thereof. Suitable examples are fatty acids having from 8 to 22 carbon atoms, or salts thereof. In the context of this application the wording "fatty acid" refers to the acid as well as the salt of the acid. Such a fatty acid may be a saturated or unsaturated fatty acid. Suitable examples of such fatty acids are caprylic acid, capric acid, lauric acid, myristic acid, palmitic acid, stearic acid, arachidic acid, decenoic acid, palmitoleic acid, oleic acid, linoleic acid, linolenic acid, and mixtures thereof. A preferred fatty acid is stearic acid and the salt thereof. The coating agent is used in order to increase the hydrophobic nature of the LDH and improve its compatibility with polymeric matrices such as polyvinyl chloride (PVC). This fatty acid treatment can be conducted in any way known in the art. The fatty acid can be added before, during or after step b) of the process of the invention. After the LDH is formed, the fatty acid can be added to the slurry in a molten state or in solid form. The fatty acid may also be added to the slurry or solution before or during the solvothermal treatment of step b). This latter route is preferred over the former because the resulting product is more hydrophobic and its compatibility with a polymeric matrix such as PVC is improved. Moreover, the treated LDH may form less agglomerates and may be more finely and uniformly distributed throughout a polymeric matrix. It is believed—without wishing to be bound by any theory—that the treated LDH is coated more efficiently and more extensively compared to a treated LDH obtained via the after-treatment route. Alternatively, the fatty acid can be added to the slurry or solution as a magnesium or zinc salt in step a) or during step b) of the process of the invention. This has the advantage that the magnesium and/or zinc ions of the fatty acid salt can be used in the formation of the LDH, so that no salts remain in the waste stream. Suitable examples of such fatty acid salts are magnesium stearate and zinc stearate.

The amount of coating agent used in the process of the invention generally is from 0.01 to 10 percent by weight (wt %), preferably from 0.1 to 8 wt %, and most preferably from 0.2 to 5 wt %, based on the weight of the divalent and trivalent metal ion sources.

The invention thus also pertains to a treated layered double hydroxide obtained by addition of a fatty acid before or during step b) of the process of the invention.

The LDH prepared according to the process of the invention can be used in applications in which these carbonate-containing LDHs are conventionally used. An example is the use of the LDH described above in PVC.

The present invention is further illustrated in the Examples below.

EXAMPLES

A commercially available fatty acid was used as received. The Kortacid® PH05, a blend of palmitic and stearic acid, was supplied by Oleochemicals GmbH, a company of Akzo Nobel Chemicals.

Example 1

An aqueous slurry containing 26.4 g $MgCO_3$, 38.9 g MgO, 48.7 g ATH, and 1,386 g deionized water was milled in a pearl mill to obtain a slurry containing solids having an average particle size of between 2.5 and 3.0 µm (measured using a Malvern Mastersizer S). The milled product was transferred to a 2 l autoclave. The slurry was stirred and heated to 170° C., at which temperature it was kept for 60 minutes. Subsequently, the slurry was cooled to room temperature. The white solids were dried. XRD and Infrared analyses revealed the formation of a hydrotalcite (having carbonate as charge-balancing anions). The average L/D values were determined using a Scanning Electron Microscope (SEM); the average L/D value was around 260. The average length of the individual platelets was well above 600 nm.

For comparison, the average L/D value of a commercial LDH containing carbonate as charge-balancing anion, i.e. Alkamizer 1 ex Kyowa, was determined. The average L/D value was determined to be around 55. The average length of the individual platelets was around 300 nm.

Example 2

An aqueous slurry containing 37.7 g hydromagnesite ($4MgCO_3 \cdot Mg(OH)_2 \cdot 5H_2O$), 35.5 g MgO, 48.4 g ATH, and 1,378 g deionized water was milled in a pearl mill to obtain a slurry containing solids having an average particle size of between 2.5 and 3.0 µm (measured using a Malvern Mastersizer S). The milled product was transferred to a 2 l autoclave. The slurry was stirred and heated to 170° C., at which temperature it was kept for 60 minutes. Subsequently, the slurry was cooled to 85° C. and molten Kortacid PH05 (1.4 g per 1,000 g slurry) was added, stirred for another 60 minutes, cooled to room temperature, and the solids were dried. XRD and Infrared analyses revealed the formation of a hydrotalcite (having carbonate as charge-balancing anions).

The hydrotalcite product contained stearic acid and palmitic acid and showed increased hydrophobic behaviour compared to the uncoated hydrotalcite of Example 1. This increased hydrophobic behaviour was demonstrated by the formation of two layers: the first, upper layer being the slurry of the hydrotalcite product and the second, bottom layer being a clear layer of water expelled from the slurry.

Example 3

An aqueous slurry containing 37.7 g hydromagnesite ($4MgCO_3.Mg(OH)_2.5H_2O$), 35.5 g MgO, 48.4 g ATH, and 1,378 g deionized water was milled in a pearl mill to obtain a slurry containing solids having an average particle size of between 2.5 and 3.0 μm (measured using a Malvern Mastersizer S). The milled product was transferred to a 2 l autoclave. The slurry was stirred and heated to 170° C., at which temperature it was kept for 60 minutes. Subsequently, the slurry was cooled to 80° C. and sodium stearate (1.4 g per 1,000 g slurry) was added, stirred for another 60 minutes, cooled to room temperature, and the solids were dried. XRD and Infrared analyses revealed the formation of a hydrotalcite (having carbonate as charge-balancing anions).

The hydrotalcite product contained stearate and showed increased hydrophobic behaviour compared to the uncoated hydrotalcite of Example 1. This increased hydrophobic behaviour was demonstrated by the formation of two layers: the first, upper layer being the slurry of the hydrotalcite product and the second, bottom layer being a clear layer of water expelled from the slurry.

Example 4

An aqueous slurry containing 37.7 g hydromagnesite ($4MgCO_3.Mg(OH)_2.5H_2O$), 35.5 g MgO, 48.4 g ATH, and 1,378 g deionized water was milled in a pearl mill to obtain a slurry containing solids having an average particle size of between 2.5 and 3.0 μm (measured using a Malvern Mastersizer S). The milled product was transferred to a 2 l autoclave, and Kortacid PH05 (1.4 g per 1,000 g slurry) was added to the aqueous slurry. The slurry was stirred and heated to 170° C., at which temperature it was kept for 180 minutes. Subsequently, the slurry was cooled to room temperature. The solids were dried. XRD and Infrared analyses revealed the formation of a hydrotalcite (having carbonate as charge-balancing anions).

The hydrotalcite product contained stearic acid and palmitic acid and showed increased hydrophobic behaviour compared to the uncoated hydrotalcite of Example 1. It further showed a substantially increased hydrophobicity compared to the coated hydrotalcite of Example 2, as the size of the clear water layer for this Example was more than twice that of the clear layer obtained for Example 2.

Example 5

An aqueous slurry containing 41.8 g MgO, 39.6 g ATH, and 1,419 g deionized water was milled in a pearl mill to obtain a slurry containing solids having an average particle size of between 2.5 and 3.0 μm (measured using a Malvern Mastersizer S). The milled product was transferred to a 2 l autoclave and heated to 150° C. After 90 minutes gaseous $CO_2$ was injected into the autoclave to raise the pressure inside the autoclave to 5 bar, which pressure was maintained for 4 hours. After 4 hours the $CO_2$ injection was stopped. The resulting slurry was cooled to room temperature and the white solids were dried. XRD and Infrared analyses revealed the formation of a hydrotalcite (having carbonate as charge-balancing anions).

Example 6

An aqueous slurry containing 34.3 g basic zinc carbonate ($Zn_5(CO_3)_2(OH)_6$), 30.2 g MgO, 48.8 g ATH, and 1,387 g deionized water was milled in a pearl mill to obtain a slurry containing solids having an average particle size of between 2.5 and 3.0 μm (measured using a Malvern Mastersizer S). The milled product was transferred to a 2 l autoclave. The slurry was stirred and heated to 170° C., at which temperature it was kept for 60 minutes. Subsequently, the slurry was cooled to 85° C. and molten Kortacid PH05 (1.4 g per 1,000 g slurry) was added and stirred for another 60 minutes. The solids were dried. XRD and Infrared analyses revealed the formation of a hydrotalcite (having carbonate as charge-balancing anions).

The hydrotalcite product contained stearic acid and palmitic acid and showed some hydrophobic behaviour.

The average L/D values were determined using a Scanning Electron Microscope (SEM), the average L/D value being around 260. The average length of the individual platelets was well above 600 nm.

For comparison, the average L/D value of a commercial zinc-containing LDH containing carbonate as charge-balancing anion, i.e. Alkamizer 4 ex Kyowa, was determined. The average L/D value was determined to be around 55. The average length of the individual platelets was around 300 nm.

Example 7

An aqueous slurry containing 34.3 g basic zinc carbonate ($Zn_5(CO_3)_2(OH)_6$), 30.2 g MgO, 48.8 g ATH, and 1,387 g deionized water was milled in a pearl mill to obtain a slurry containing solids having an average particle size of between 2.5 and 3.0 μm (measured using a Malvern Mastersizer S). The milled product was transferred to a 2 l autoclave and Kortacid PH05 (1.4 g per 1,000 g slurry) was added to the aqueous slurry. The slurry was stirred and heated to 170° C., at which temperature it was kept for 60 minutes. Subsequently, the slurry was cooled to room temperature. The solids were dried. XRD and Infrared analyses revealed the formation of a hydrotalcite (having carbonate as charge-balancing anions).

The hydrotalcite product contained stearic acid and palmitic acid and showed increased hydrophobic behaviour compared to the hydrotalcite obtained in Example 6, where the fatty acids were added after the reaction.

The invention claimed is:
1. A process for preparing a layered double hydroxide having an average length over diameter (L/D) ratio of the individual platelets above 100 and comprising carbonate as charge-balancing anion comprising:
    solvothermally treating a precursor slurry or solution comprising a trivalent metal ion source, a divalent metal ion source, a suspending medium and, if the slurry or solution does not contain a divalent metal ion source containing carbonate, a carbonate source, to form the layered double hydroxide comprising carbonate.

2. The process according to claim 1 wherein the divalent metal ion is at least one of magnesium and zinc and the trivalent metal ion is aluminum.

3. The process according to claim 1 wherein the divalent metal ion source is selected from the group consisting of magnesium hydroxycarbonate, hydromagnesite, magnesium carbonate, magnesium bicarbonate, and dolomite.

4. The process according to claim 1 wherein the precursor slurry or solution further comprises a further divalent metal ion source is selected from the group consisting of MgO, brucite, and mixtures thereof.

5. The process according to claim 1 wherein the carbonate source is carbon dioxide.

6. The process according to claim 1, further comprising adding a fatty acid to the precursor slurry or solution before or after the formation of the layered double hydroxide.

7. The process according to claim 2 wherein the divalent metal ion source is selected from the group consisting of magnesium hydroxycarbonate, hydromagnesite, magnesium carbonate, magnesium bicarbonate, and dolomite.

8. The process according to claim 2 wherein the precursor slurry or solution further comprises a further divalent metal ion source selected from the group consisting of MgO, brucite, and mixtures thereof.

9. The process according to claim 3 wherein the precursor slurry or solution further comprises a further divalent metal ion source selected from the group consisting of MgO, brucite, and mixtures thereof.

10. The process according to claim 6 wherein the carbonate source is carbon dioxide.

11. The process according to claim 6 wherein the fatty acid is stearic acid or a salt thereof.

* * * * *